Figure 4:
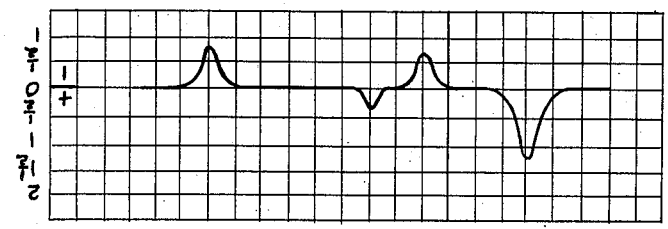

June 27, 1944.  G. HERZOG  2,352,433

WELL-LOGGING

Filed Feb. 12, 1943

GERHARD HERZOG
INVENTOR

BY
His Attorney

Patented June 27, 1944

2,352,433

UNITED STATES PATENT OFFICE 2,352,433

WELL LOGGING

Gerhard Herzog, Houston, Tex., assignor to The Texas Company, New York, N. Y., a corporation of Delaware Application February 12, 1943, Serial No. 475,644

3 Claims. (Cl. 250—83.6)

This invention relates to an improvement in the methods of geophysical prospecting and particularly to a method of accurately determining the interfaces of the subsurface formations adjacent a well bore.

The various methods of determining the stratigraphy of formations penetrated by a well bore, which utilize an instrument or device lowered into the well from which a continuous record is obtained indicating the characteristics of these formations, may be divided into two categories of well-logging, namely, electrical and radiological well-logging. The majority of these methods operate on the principle that the various subsurface formations possess certain characteristics which are peculiar to the individual formations and the measurement of which, in correlation with depth, is indicative of the type and position of the formation. These methods of prospecting have been applied to the production of such resources as lie beneath the surface of the earth and which are reached and obtained through the medium of a bore hole.

In the development of these methods of well-logging particular emphasis has been placed on the modification and construction of such apparatus and measuring systems as would permit a more accurate determination of the characteristics of the formations and/or an increase in the rate of logging. Usually where the accuracy of the instruments and measuring systems has been improved, the rate of logging necessary to secure such accuracy must be diminished, and, conversely, where the rate of logging has been increased, a loss of detail in the record of the measurements has been noted. Since the object of these methods of logging is the determination of the composition of the subsurface formations and their exact position in relation to the well bore, any factor which tends to obscure or render inaccurate these determinations is of primary importance. Such a factor is the inability of the various detecting and recording mechanisms to sharply produce upon the record an abrupt change in magnitude of the characteristic occasioned by passage through an interface. In the usual well-logging records the transition from one formation to an adjacent one having a different magnitude of characteristic, appears as a gradual curve whose slope is dependent upon the rate at which the instrument passes the interface, the length of the instrument, and the time lag of the recording system.

In accordance with the present invention a method has been devised whereby the position of the interfaces of the subsurface formations adjacent a well bore may be accurately determined while simultaneously determining the relative change in magnitude of the characteristics of the formations in passing from one formation to the other. These determinations may be made through the use of any of the known methods and apparatus of geophysical prospecting, whether electrical or radiological, utilizing an instrument lowered into the well bore which continuously detects and measures the characteristics peculiar to the individual formations. In the operation of this improved method, the instrument is inserted into the well and passed through the formations of which information is desired while continuously recording an indication of the magnitude of the characteristic in correlation with the position of the instrument in the well. Then the instrument is passed in the opposite direction through the same formations and a second record of the magnitude of the characteristic is obtained. The values obtained from the two records taken in opposite directions at corresponding positions in the well bore are then subtracted one from the other and the resultant values recorded in correlation with their position in the well bore. Thus, if it is desired that the entire length of the well bore be logged, the instrument traverses the entire length, at least in one direction, while continuously recording and is then reversed and either traverses the entire length of the well in the opposite direction while recording, or only through those formations which, upon examination of the first record, are considered of interest and whose interfaces are deemed critical. The values of the two records obtained from the instrument, when operating in opposite directions, are then subtracted one from the other, in accordance with their position in the well and the resultant values obtained are recorded in correlation with the depth. The final record obtained from the subtraction will appear subtsantially as a straight line graph which is intermittently broken by positive or negative peaks whose apex indicates the exact position of the interfaces of the formations adjacent the well bore. The amplitude of these peaks, whether positive or negative, on the resulting graphical record is indicative of the change in value of the particular characteristic when passing from one formation to the other through the particular interface whose position is indicated by the presence of the peak. The polarity of these peaks depends upon the order of subtraction of the two records and indicates whether the difference in characteristic of the formations adjacent the interface is either an increase or a decrease in magnitude.

It is to be understood that the term "instrument" as used throughout the specification and claims, is meant to embrace any device used either in the electrical or radiological methods of geophysical prospecting which is that portion of the apparatus of these methods inserted into the well bore for the detection and determination of the characteristics of the subsurface formations.

This improved method of logging is particularly adapted to those methods of logging whose records are characterized by a gradual transition of values in the region of an interface which obscures the exact position of the interface and which is not an accurate indication of the magnitude of the characteristic in this region. This gradual transition is the result of a time lag, which is a function of the rate of logging and the sensitivity of the recording mechanisms, and/or the averaging effect produced by an instrument of considerable length. For example, if an instrument is passed from a formation of a high magnitude of characteristic to one of a low magnitude, a period of time is required for the record to register the change in value. This lag in the record is a function of the electrical recording apparatus and the rate at which the instrument passes the interface. It is particularly noticeable where the instrument is a radiation detector. On the other hand, the length of the instrument might be such that an appreciable error is introduced into the record because of the registration of the characteristic of two formations simultaneously. Again, this is particularly noticeable in the radiological methods or logging where instruments may attain a length of five to seven feet or more. When these instruments are passed from a formation of high radioactivity to one of low radioactivity there is a definite period of time in which portions of the instrument are in both formations. During this interval the output of the instrument is a ratio of the radioactivity of both formations corresponding to those portions of the instrument present in each formation. This results in an averaging effect on the record until the instrument is completely within the second formation.

These difficulties in measurement and recording may be avoided by the use of the present improved method of logging.

Figure 3:
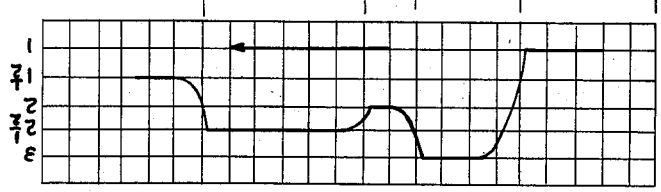
Figure 2:
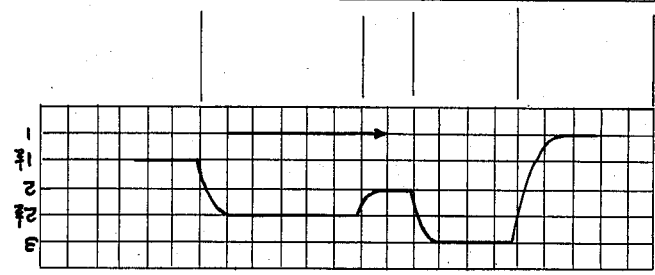
Figure 1:
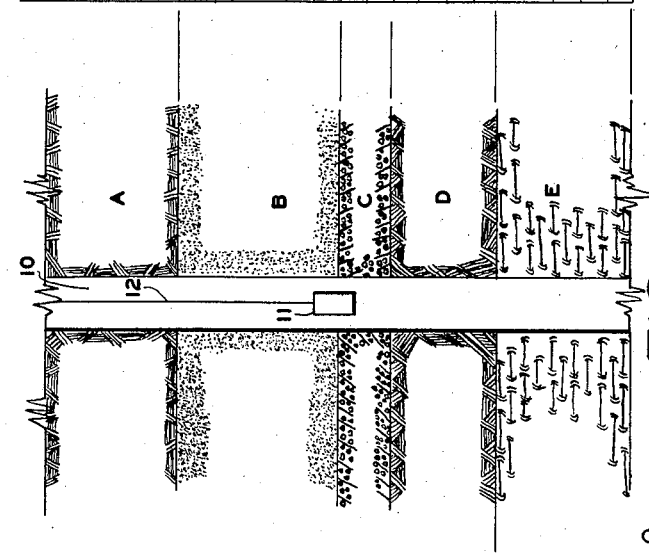

In the drawing Fig. 1 represents a diagrammatic showing of a portion of a well bore in which an instrument is suspended, and the relationship of the well bore to the various formations. Fig. 2 is a graphical illustration of the record obtained when traversing a well bore in the direction indicated. Fig. 3 is a graphical illustration of the record of the instrument obtained when traversing the well bore in the opposite direction. Fig. 4 is a representative showing of the graphical record obtained by the subtraction of one of the records illustrated in Figs. 2 and 3 from the other record.

In order to more conveniently show the operation of the method of the invention, the portion of the well bore 10, shown in Fig. 1, is represented as penetrating five subsurface formations, namely, A, B, C, D and E, as designated in the figure. The instrument 11 is suspended in the well bore 10 by means of cable 12 which connects the instrument with the surface equipment and recording mechanisms not shown in the drawing. The cable 12 further serves to carry such electrical currents, etc., as are necessary to operate the instrument and/or carry the responses of the instrument to the surface.

As previously mentioned, the instrument 11 is intended to represent such portions of the apparatus used in the electrical or radiological methods of geophysical prospecting which are normally inserted into the well bore for detection and determination of the magnitude of the characteristics of the subsurface formations. This instrument may take the form of one or more electrodes such as used in the electrical methods of well-logging, or it may represent an ionization chamber or Geiger-Muller counter which are normally used in radiological methods of logging.

The formations adjacent this portion of the well bore shown in Fig. 1, which have been given the designations of A, B, C, D and E, have been assigned an arbitrary value of their characteristic for purposes of illustration. This characteristic is that portion of the sub-surface formations which is to be measured by the particular instrument used in the logging of the well, whether it be natural radioactivity, induced radioactivity, scattering of neutrons, scattering of gamma rays, resistivity, permeability, etc. These arbitrary values assigned to the individual formations are as follows:

$$A=1\tfrac{1}{2};\ B=2\tfrac{1}{2};\ C=2;\ D=3;\ E=1$$

In the operation of the method of logging, the principle of the invention is applied to any of the methods of well-logging regardless of the order in which the well is logged, as, for example, either logging down the well or starting from the bottom of the well and logging upward. In logging the well downward the instrument first passes through formation A. After the record reaches equilibrium the output of the instrument will be indicated on the record as shown in Fig. 2 at a substantially constant value of 1½. As the instrument reaches and begins to pass the interface AB, the record begins to approach the characteristic value for the next formation, namely, B. The records shown in the drawing are those obtained by an instrument of finite length and the reference point is taken as the center of the instrument. As shown in Fig. 2, an increase in magnitude is noticed just prior to the position of the interface AB. This is due to the effect or response of that portion of the instrument already present in formation B, while the major portion of the instrument remains in formation A. As the instrument progresses through the interface AB and into the formation B, the record shows a gradual transition to the equilibrium value of the characteristic for the formation B, which is 2½. The slope of this transition is dependent upon the time lag in the recording circuit, the length of the instrument and the rate at which the instrument passes the interface AB. The position on the record, where the initial differences in magnitude are manifested, is dependent upon the length of the instrument. As the length of the instrument approaches a point detector, this position will approach a position corresponding to that of the interface. After it has reached the equilibrium value of 2½ for the formation B the record remains substantially constant until the instrument reaches the interface BC. Since there is a drop in characteristic value between the formations B and C, the record shows a gradual transition until the instrument is wholly within the formation C or until the time lag created by the speed at which the instrument passes through the interface has been taken up by the response of the recording mechanism and the final registration on the record. This transition period is noticed wherever there is a change in value of the characteristic, as illustrated by passage through an interface whose adjoining formations are of different magnitudes of characteristic.

The final record of the instrument 11, when passing downwardly through the formations A, B, C, D and E, is represented substantially by the record shown in Fig. 2. The transition periods for the different interfaces are considerably magnified in the figure, but the principle applicable thereto remains the same, and it is easily observed from the record produced by the instrument that the position of the interface adjacent the well bore cannot be determined accurately. After proceeding through the formations the motion of the instrument is reversed and the same formations logged in an opposite direction.

The record resulting from the logging of the formations from the direction E to A is substantially the same record as obtained in the direction of A to E, with the exception of the parts where transitions occur. Here the two records are displaced in opposite directions from the interfaces and the transition curves are of an opposite curvature. Thus, as the instrument reaches and passes the interface ED the record shows up a gradual transition of the characteristic until the equilibrium value of the formation D is reached. During these transition periods, as shown in the record, the values obtained are not the true value of the characteristic at the particular position in the well.

This second record need not necessarily be a complete duplication of the first record, since in many instances only a few formations are deemed critical and these critical formations may be observed upon a cursory examination of the first record. If, upon examination of the first record certain isolated formations are noted which are considered of interest, the return log may be limited to the neighborhood of those critical formations and the exact position of the interfaces of those formations determined. Upon completion of the first and second logs in opposite directions, as illustrated in Figs. 2 and 3, the values obtained thereon are then subtracted one from the other in the order desired, and the subtracted values then graphed on the final record.

This subtraction of the records may be accomplished in numerous ways. If only a few formations are relogged in the opposite direction, the subtraction of the records may be done graphically. If a considerable length of the records is to be subtracted an automatic recorder may be desirable. The type of recorder and method of subtraction will depend upon the type of recording instrument used in the original method of logging. One method of obtaining subtraction records is that method by which the amplitudes of the characteristic are indicated on the recorder by the blackened areas on a photographic film. This film then may be sent through a reproducing instrument consisting of a light beam which passes through the film and falls on to a photoelectric cell. The current output of this cell is proportional to the amplitude of the record, as illustrated by the blackened areas of the film. In subtracting the amplitudes of two records of this type both films are simultaneously run through two reproducing machines and the output of the two photronic cells can be automatically subtracted by well-known electric circuits and the subtracted values reproduced on the final record. The final record obtained by graphically subtracting the record shown in Fig. 2 or 3 from the other is represented by the record shown in Fig. 4. The order of subtraction is the record of Fig. 2 minus the record of Fig. 3.

The resulting record as shown in Fig. 4 is substantially a straight line graph broken by positive or negative peaks whose apex determines the exact positions of the various interfaces. The amplitude of these peaks, whether positive or negative, is an indication of the change in magnitude of the characteristic of the formations adjacent the interface whose position is shown by the peak. These amplitudes possess a proportionate relationship to the change in magnitude of the characteristics which remains uniform throughout the record. This proportional relationship may be calculated for any given system of well-logging. In Fig. 4 it is assumed to be approximately .7. Thus, upon an analysis of the record shown in Fig. 4, the apex of the negative peak, which accurately indicates the interface between formations A and B, and the amplitude has a value of minus .7. This amplitude, although negative, in view of the order of subtraction of the records, shows that the difference between the magnitude of the characteristic of formation A and formation B is 1, which checks with the original values, since formation A has a value of 1½ and formation B has a value of 2½. From this it may be seen that every increase in magnitude of the characteristic when viewed in the direction of A to E will result in the final graph as a negative peak. The peak 2, indicating the position of the interface between formation B and formation C, has a positive value and an amplitude of .35. This amplitude indicates that the difference in magnitude of the characteristic between formation B and formation C is ½, and that the difference is minus ½ of that of formation B. This checks with the original values since formation B has a value of 2½ and formation C a value of 2. Thus, from an examination of the subtracted record, an accurate indication of the position of the interfaces in the well bore may be obtained and their relative value with respect to each other may be determined by the amplitude of the peaks of the record.

Obviously many modifications and variations of the invention, as hereinbefore set forth, may be made without departing from the spirit and scope thereof, and, therefore, only such limitations should be imposed as are indicated in the appended claims.

I claim:

1. A method of determining the stratigraphy of the formations adjacent a well bore, which comprises inserting into a well bore an instrument adapted for use in the determination of the characteristics of the surrounding formations, passing the instrument through the formations of which information is desired while continuously recording the characteristics thereof, reversing the motion of the instrument, repassing the instrument through the said formations while continuously recording the characteristics thereof, and subtracting one of the two records obtained from the other record.

2. A method of accurately determining the position of the interfaces of the subsurface formations adjacent a well bore through the use of instruments adapted to the determination of the characteristics of the formations, which comprises passing the instrument through the formations of which information is desired while simultaneously recording an indication of the magnitude of the characteristics in correlation with the position of the instrument in the well bore, reversing the motion of the instrument, repassing the instrument through the said formations while simultaneously recording, subtracting the amplitude obtained from one of the two records from the amplitude obtained from the other record at corresponding positions in the well, and recording the resultant values in correlation with the position in the well bore.

3. A method of determining the nature and location of underground formations traversed by a well bore, which comprises placing in said bore an instrument responsive to radiation from the surrounding formations, passing said instrument through the formations of which information is desired, in one direction, while continuously recording the radiation from said formations in correlation with the position of the instrument in the hole, passing said instrument through said formations in the opposite direction while continuously recording the radiation from said formations in correlation with the position of the instrument in the hole, and subtracting one of the two records so obtained, from the other record.

GERHARD HERZOG.